United States Patent
Rupe et al.

(10) Patent No.: US 8,451,465 B2
(45) Date of Patent: May 28, 2013

(54) AUTOMATIC DEVICE-INDEPENDENT ADAPTATION OF PAGE DESCRIPTION LANGUAGE DATA STREAMS

(75) Inventors: Daniel K. Rupe, Fairport, NY (US); Harpreet Singh Kohli, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 813 days.

(21) Appl. No.: 12/626,750

(22) Filed: Nov. 27, 2009

(65) Prior Publication Data

US 2011/0128563 A1 Jun. 2, 2011

(51) Int. Cl.
*G06F 3/12* (2006.01)
*G06K 15/00* (2006.01)

(52) U.S. Cl.
USPC ........................................ 358/1.13; 358/1.15

(58) Field of Classification Search
USPC ................ 358/1.1, 1, 8, 1.9, 1.13, 1.14, 1.18, 358/474, 402, 464; 710/210, 263; 382/276
See application file for complete search history.

(56) References Cited

U.S. PATENT DOCUMENTS

| | | | |
|---|---|---|---|
| 5,271,065 A | | 12/1993 | Rourke et al. |
| 5,819,014 A | * | 10/1998 | Cyr et al. ..................... 358/1.15 |
| 6,934,044 B1 | * | 8/2005 | Khandelwal ................. 358/1.15 |
| 7,126,703 B1 | * | 10/2006 | Gillihan et al. .............. 358/1.14 |
| 7,161,705 B2 | | 1/2007 | Klassen |
| 7,936,472 B2 | * | 5/2011 | Ferlitsch et al. ............. 358/1.15 |
| 7,990,569 B2 | * | 8/2011 | Hino .............................. 358/1.2 |
| 2004/0196496 A1 | | 10/2004 | Klassen |
| 2004/0196497 A1 | | 10/2004 | Klassen et al. |
| 2007/0091368 A1 | * | 4/2007 | Gokaraju et al. ............ 358/1.18 |
| 2008/0112013 A1 | * | 5/2008 | Ferlitsch et al. ............. 358/3.28 |
| 2009/0279124 A1 | * | 11/2009 | Liu et al. ...................... 358/1.15 |

* cited by examiner

*Primary Examiner* — Gabriel Garcia
(74) *Attorney, Agent, or Firm* — Michael J. Nickerson; Basch & Nickerson LLP (57) ABSTRACT

A system and methodology are described herein that enable a network with a plurality of independent computers, with differing print drivers having generated various otherwise potentially incompatible page description language print jobs, to successfully interface with a centralized printer system through a plurality of lines by virtue of on-the-fly adaptation of the page description language stream job headers before the jobs go to a subsequently designated print device. The header is consumed and parsed to mitigate print-stream header differences by transforming the header commands into page description language commands and imbedding the page description language commands in the original page description language data, and therefrom sending on a resulting pure page description language stream. The resulting pure page description language stream is necessarily a modification of the original page description language data, designed to produce a result compliant with the request as manifest in the originating header.

15 Claims, 4 Drawing Sheets

AUTOMATIC DEVICE-INDEPENDENT ADAPTATION OF PAGE DESCRIPTION LANGUAGE DATA STREAMS

BACKGROUND

The teachings provided herein are directed generally to network printer job control, to interpreting jobs written in one of a plurality of page description languages for printing with a printing apparatus, and more particularly to a method directed at resolving different print drivers and print job headers in a centralized print job environment.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to a personal computer.

However, printers used for this purpose are typically small laser printers which have limited functions and features such as a limited tray capacity which restricts the number and types of copy sheets that can be used to make prints on, or which do not have a finishing capability, etc. Small printers also typically do not following the PostScript™ Printer Control Language standards, employing some proprietary page description language instead, typically handling only some subset of a full page description language.

Larger high speed laser printers normally have a great deal of finishing and copy sheet capability which would allow the personal computer user to have, for example, custom printing and finishing of the work product, an option which for many personal computer users would be highly desirable.

In practice, the personal computers can be used advantageously with a network printing system of the type combining a number of client inputs, such as the personal computers, or the like, and one or more printer outputs. In one example of such network printing systems, a client at one of the inputs sends electronic documents that comprise a job over a local area network (local area network) to one of the printers selected for printing of the job.

In particular, local area networks provide users running dedicated processors the ability to share resources such as printers, file servers, and scanners. Integration of shared resources has been a problem addressed by local area network managers. Local area network managers have made different network protocols transparent to devices running different network protocols. Local area networks also have a variety of print drivers emitting different page description languages, which are directed to specific printer devices.

A page description language is a method of describing printed page(s) in a printer independent format. No standard page description language presently exists, and as a result a number of industry standards have emerged. A page description language establishes an interface between a print driver or client and a print server or printer. Existing page description languages include PostScript™, Hewlett-Packard™ Printer Control Language, and Interpress™ Page Description Language.

Many printing manufacturers provide differing print drivers, which place device dependent information into the page description language print streams as handled by centralized print systems. When it is desirable to redirect this page description language stream to a different printer, this can result in scenarios ranging from outright print job failure, to corrupted print jobs, to undesirable required involvement from an operator in order to direct a print job to completion.

It would therefore be desirable for such a system if there was a homogenous page description language that could be shared among many devices. There are many examples of systems that would be improved by device independent page description languages—such as load balancing systems and print control systems. This need has been solved in the past by generic printer drivers, which place page description language elements that are commonly shared among most devices into their streams.

However, generic printer driver solutions require costly administrative overhead and require the replacement and use of only the customized queues. The generic printer driver solutions may also limit users to a small sub-set of functionality and disable native driver features.

Other output management systems do not attempt to solve the problem regarding device independent page description language streams. The output management systems instead require that an administrator group the hardware devices into compatible or similar families of devices. If any devices cannot be made part of the group, those devices cannot be used by the technology. Examples of such systems include roaming printing or device error detection systems.

Requiring such grouping of hardware is difficult and expensive, particularly for organizations that already have a substantial hardware investment. It may also mean underutilization of devices in the output management systems or necessitate unnecessary purchases of new equipment.

Therefore, it would be desirable to utilize a homogenous page description language that could be shared among many devices.

BRIEF DESCRIPTION OF THE DRAWINGS

The drawings are only for purposes of illustrating various embodiments and are not to be construed as limiting, wherein.

DETAILED DESCRIPTION

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

As described below in more detail, an automatic device-independent adaptation of page description language data streams methodology automatically adapts page description language streams into compliance for a majority of printing devices. No changes to the existing printer driver queues are necessary—device dependent printer drivers are left intact on the system. Page description language data streams are captured before the page description language data streams are sent to a print device and adapted programmatically to ensure conformance across many devices.

One source of the incompatibilities between device controllers is page description language headers. As described below in more detail, the automatic device-independent adaptation of page description language data streams methodology mitigates the page description language header differences and sends a pure page description language stream to a print device wherein the header of the page description language stream has been removed and the page description language stream has been altered to provide device independence.

The system and methodology described below enable a network with a plurality of independent computers, with differing print drivers having generated various otherwise potentially incompatible page description language print jobs, to successfully interface with a centralized printer system through a plurality of lines by virtue of on-the-fly adaptation of the page description language stream job headers, prior to the jobs being received by a subsequently designated print device.

The header is first consumed and parsed to mitigate printstream header differences by transforming the header commands into page description language commands and imbedding the page description language commands in the original page description language data, and therefrom sending a resulting pure page description language stream.

The resulting pure page description language stream is necessarily a modification of the original page description language data designed to produce a result compliant with the request as manifest in the originating header. If the header commands cannot be honored, different mitigating courses of action may be taken such as notification of the user, or the non-compliance may simply be ignored and an as best-can-do job printed anyway.

Figure 1:
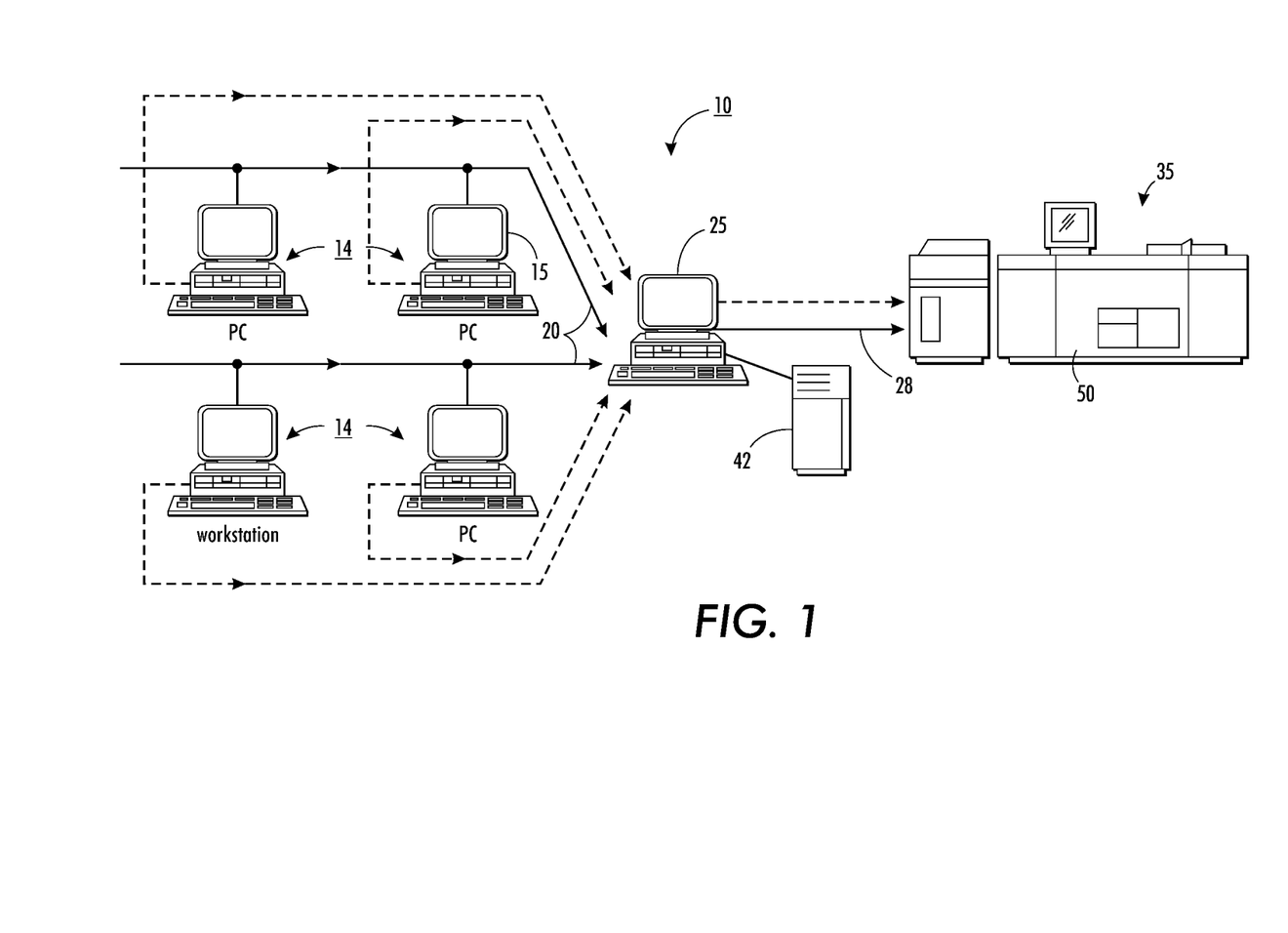
FIG. 1 is a schematic view of a printing arrangement including a plurality of client workstations interfaced with a printing apparatus by a server.

Referring to FIG. 1, there is shown a printing arrangement, designated generally by the numeral 10. The printing arrangement 10 includes a plurality of remote inputs such as desktop computers, laptops, notebooks, personal digital assistants, personal computing devices, workstations, etc. (referred to herein as workstations 14), coupled via one or more lines 20 to a server 25. Workstations 14 may include a display screen 15 together with keyboard and mouse for entering programming instructions, image data, etc. The display screen 15, which may be a touchscreen, displays various job program choices, operator instructions, messages, etc. The server 25 is coupled through one or more networks 28 to one or more printing systems 35.

Figure 2:
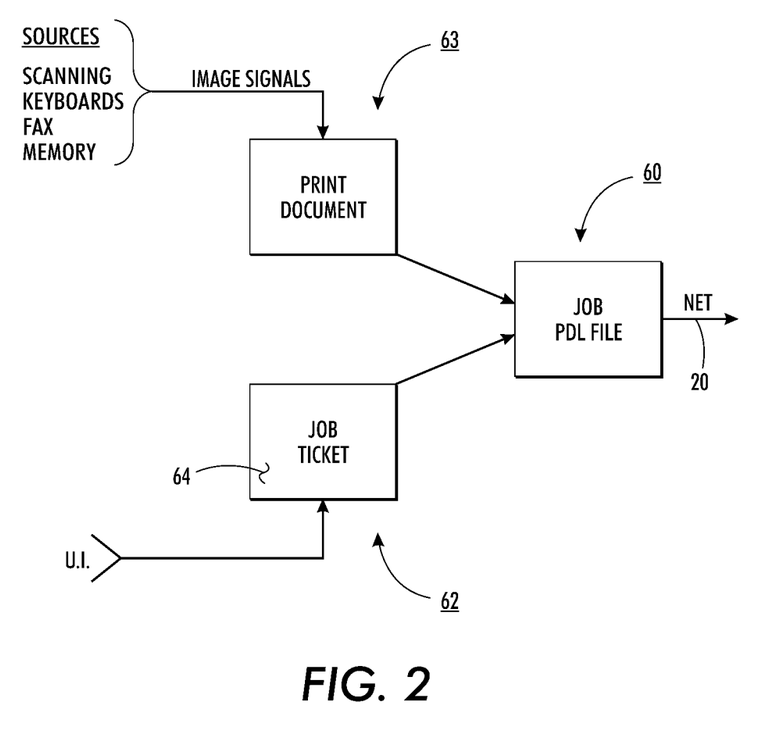
FIG. 2 is a schematic view of a job file and the contents thereof.

Referring to FIG. 2, electronic job page description language files 60, or parts thereof, are created at the individual workstations 14. Each job file may include a job specification 62 and print document 63, expressed in a page description language. Job specification 62 may be in the form of a job ticket 64 having instructions for routing, handling, and processing of the job specification 62.

As will be clarified from the discussion below, the page description language of print document 63 may be either written in Postscript™ or Hewlett-Packard™ Printer Control Language or other image data language.

The print document 63 are electronic in form, consisting of image signals or pixels generated, for example, by scanning hard copy documents and converting the document images to image signals or pixels, directly by a keyboard, taken from memory, or consisting of page format and/or graphic output commands all encoded in one of the page description language encodings.

The content of the job files may be compressed to increase bandwidth and reduce the amount of storage required. The image signals, pixels, or page description language instructions in print document 63 are arranged as electronic documents or pages for printing on a print media such as paper stock or sheets.

The server 25 of FIG. 1 includes any suitable interface for receiving job page description language files 60 from a workstation via a network, with the ability to access and decode the job processing instructions on the accompanying job ticket. The server 25 of FIG. 1 may include an on-board memory of suitable capacity for temporarily storing the job files pending processing thereof by printing system 35 of FIG. 1. The print manager on-board memory may be large enough to support long term storage of the job files or parts of the job files. Alternately, one or more remote memories 42 (FIG. 1) may be provided for this purpose.

The printing system 35 of FIG. 1 may include one or more high speed electronic printers 50 of FIG. 1 for processing jobs in accordance with the instructions input through the job ticket accompanying each job file. While a single printer 50 is shown in FIG. 1, a plurality of printers, either at a single central location or at several remote locations may be envisioned.

In FIG. 1, printer 50, for example, may be a xerographic based printer, an ink jet printer, an ionographic printer, LED printer, and the like.

Figure 3:
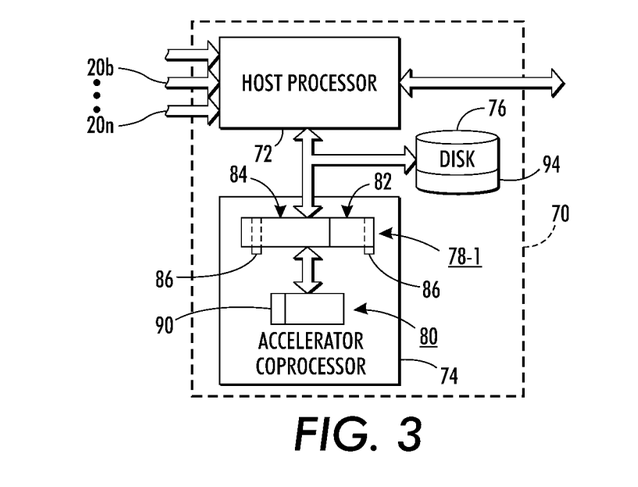
FIG. 3 is a schematic, block diagrammatic view of the server and the printing apparatus used to implement the technique of the present invention.

Referring to FIG. 3, the structure of the server 25 is discussed in further detail. The interpreter 70, which is located within server 25 (FIG. 1), includes a host processor 72, an accelerator coprocessor card 74 and a disk storage device 76. The host processor 72 accepts incoming printing jobs from any one of the network lines 20a, 20b, . . . 20n, as shown. Systems for polling the various lines 20a, 20b, . . . 20n for incoming jobs, such as with "round-robin" polling, are well-known to those skilled in the art.

The host processor 72 is capable of transferring data to and from the accelerator coprocessor card 74 through a sliding shared memory window. The accelerator coprocessor card 74 also can use a small section of the host processor's input/output address space. By writing to an input/output data port of the accelerator coprocessor card 74, the host processor 72 is able to send commands to the accelerator coprocessor card 74.

In turn, by reading the input/output data port, the host processor 72 is able to receive acknowledgement messages back from the accelerator coprocessor card 74. These messages are typically used to synchronize the actual data transfers in shared memory. For example, the data ports may be used to communicate synchronizing swap requests and acknowledgements between the accelerator coprocessor card 74 and the host processor 72 prior to the actual transfer of page description language decomposer code and font cache data.

Referring still to FIG. 3, the accelerator coprocessor card 74 is shown with a memory map 78-1, which includes all of the software necessary to interpret a page description language, and a microprocessor 80.

Figure 4:
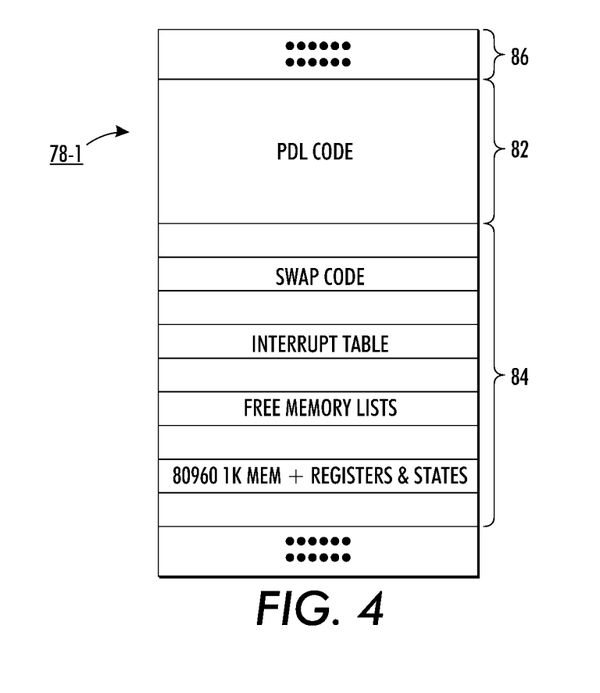
FIG. 4 is a schematic view of a context file, i.e., a sequence of instructions, employed to translate page description language contained in the job file.

Referring now to FIG. 4, the memory map 78-1, which includes a user section 82 and a system section 84, is shown in greater detail. The memory map 78-1 further includes a section 86 having registers providing communication capability and flag designation.

As illustrated in FIG. 4, the user section 82 comprises a section for retaining page description language interpretation code, the page description language interpretation code being adapted to facilitate the interpretation of a job file expressed in a first page description language, such as Interpress™ PostScript™, or Hewlett-Packard™ Printer Control Language.

The page description language interpretation code facilitates translation of the job page description language file 60 from a first page description language, such as Interpress™, PostScript™, or Hewlett-Packard™ Printer Control Language; into a second page description language file, which is provided without a header, the header commands having been embedded within each page.

It should be appreciated that only selected portions of the system section 84 are shown. Much of the software for the section 84 simply serves as one of various approaches for implementing the processes illustrated in FIG. 5, the significance of which processes will be discussed in further detail below.

It will be recognized by those skilled in the art that, in practice, various software tools, such as tables, e.g., fault, system procedure and control tables, timers and controls therefore, control implementations, storage locations, stacks and debuggers would typically be employed in to implement the system section 84.

Referring to FIGS. 3 and 4, the microprocessor 80 of the accelerator coprocessor card 74 includes a section 90 which contains information regarding the internal state of the microprocessor 80. This information can be selectively stored in a layer of the system section 84.

Referring specifically to FIG. 3, both the host processor 72 and the accelerator coprocessor card 74 are coupled with a disk drive device 76 so that, portions of the memory map 78-1 can be transferred, in the form of a context file, thereto. At any moment, one or more page description language context files, designated by the numeral 94, are stored in the disk drive 76.

Upon processing a job page description language file 60, the interpreted page description language file can be transmitted to one of a plurality of output or printing devices.

For example, the interpreted page description language file may be expressed in Interpress™, and is transmitted to the printer 50 which may include a decomposer and an image output terminal.

In operating the printer 50, the interpreted output from the host processor 72 is transmitted to the decomposer where it is decomposed into graphics and text for printing by the printer 50.

Many printing manufacturers provide differing print drivers that get widely installed on various workstations 14, and which thus place device dependent corrupted print jobs into the page description language print streams when print jobs are sent on into centralized print systems. The large number of, and changing updated nature of, these device dependent print drivers makes administration difficult.

The automatic device-independent adaptation of page description language data streams methodology parses the page description language header, and implements high-level pseudo-code logic for each unique line or high-level identifiable token (hereinafter called an element) in the header. The most common header type syntaxes are understood and adapted into the most common page description language-specific language syntaxes.

With respect to the discussion below, the page description language-specific language portion of a page description language is referred to as the page description language body.

Figure 5:
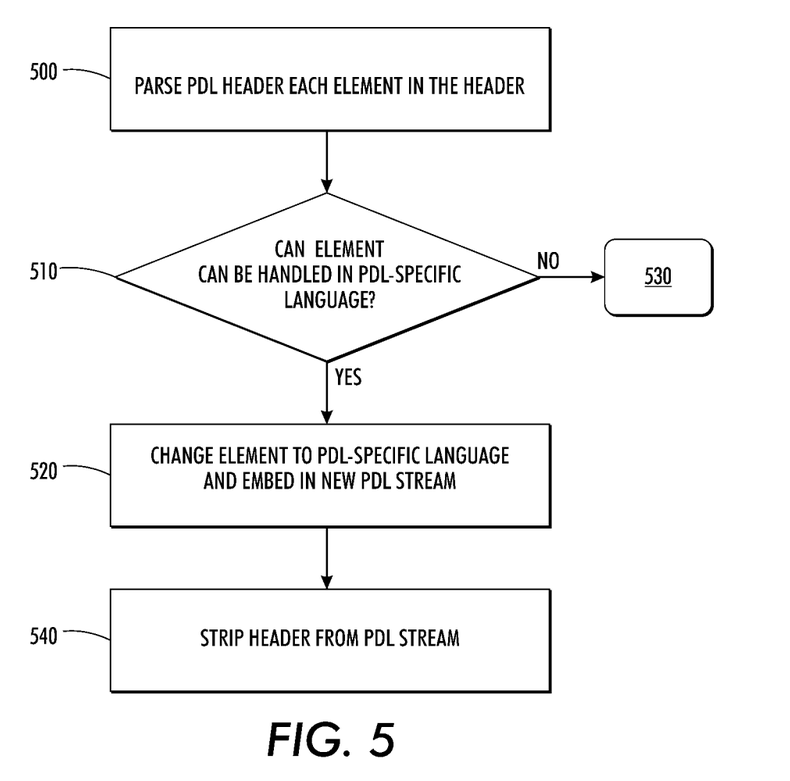
FIG. 5 depicts a flow diagram illustrating the methodology, according to the teachings provided herein.

FIG. 5 depicts a flow diagram further illustrating the methodology discussed above as operational upon a print server 25. Step 500 receives a print job page description language file 60 from the network. The job page description language file 60 may be an assembly of a print document 63 and a job ticket 62. This assembly may be generated at workstation 14, when a user of the workstation 14 submits a job file, and the installed print driver resident on the workstation 14 gets employed to create a print job.

At step 500, the print page description language job 60 is parsed to delineate the page description language header and each element in the header, from the page description language body image data which originated from the print document 63. Each page description language header comment is examined to determine if the page description language header may be handled in page description language specific language, at step 510.

If the determination is made that the page description language header can be handled in page description language specific language, the header element is changed into a page description language-specific language and is imbedded into the page description language stream, at step 520.

At step 540, the original header element is stripped or redacted from the page description language stream. This parse and replace routine is repeated until every header element has been examined and either transformed/adapted, or it is determined that the element cannot be transformed/adapted into a suitable page description language command.

The resultant new page description language data print job data stream is then directed to the most suitable of one or more available print devices. At step 530 those scenarios, which a given page description language header element cannot be adapted, are identified.

There are a number of times when a header element cannot be adapted and thus cannot be embedded in the transformed page description language stream. For example, many print streams contain customized extensions in their page description language headers, and certain other headers are interpretable only by particular device controllers.

In such situations, a number of different solution scenarios may be taken. Depending on the print system and the available print devices, the print job may be passed on and directed to a particular print device which can handle those header elements that could not be adapted or translated.

In the alternative, however, the print job can be refused, and notification provided to the originating user that the job cannot be printed as submitted.

In yet another alternative, the job could be passed on and printed, on a best can-do basis.

Further, in all the above scenarios notification may be provided to the originating user providing the user with the option of selecting what result or redirection is to be performed.

The automatic device-independent adaptation of page description language data streams methodology adapts particular header elements into the page description language body depending on the nature of the header element the automatic device-independent adaptation of page description language data streams methodology encounters. Some elements can be more easily adapted than others into the page description language body. One example of a more easily adapted element is a copy count element, the pseudo code for which is depicted in Table 1 that follows:

TABLE 1

Pseudo-code for Copy Count Handling Where Page Description
Language Supports A Document Level Copy Count

```
obtain copy count setting from header element
place new syntax in page description language body with
    obtained header value
```

The copy count parameter specified in the header simply can be placed into the page description language body with the appropriate new syntax when the resident page description language-specific language supports such a document-wide copy count setting.

Depending on the page description language-specific language used, some settings may be imbedded at various locations within the page description language body. For instance, for copy count information expressed in the header (where the document is not collated) and when the page description language-specific language does not support a document-wide copy count setting, see Table 2.

TABLE 2

Pseudo-code for Copy Count Handling Where Page Description
Language Does Not Support A Document Level Copy Count
[uncollated]

```
obtain copy count setting from header element
for each page in the document
{
    place copy count setting on page
}
```

In this case, the header element must be expressed throughout the page description language body. In that situation, the automatic device-independent adaptation of page description language data streams methodology algorithms may obtain a copy count setting from the header element and then for each page in the document, place that copy count setting on each individual page.

A different approach may be utilized when the document is to be collated. In that situation, the algorithms may obtain a copy count and repeat the entire document image data stream for each of the required number of copies in excess of one. See Table 3.

TABLE 3

Pseudo-code for Copy Count Handling Where Page Description
Language Does Not Support A Document Level Copy Count
[collated]

```
obtain copy count setting from header element
obtain stream content for entire document
// for copy count of 1, do nothing
for (i = 1; i <= to obtained copy count value − 1; i++)
{
    // repeat stream data for # of collated copies over 1
    insert obtained stream content for entire document after last
page
}
```

Although this last example results in an increase in the size of the page description language stream, it is worth noting that this type of logic is employed in such a way as to make it effective for all applications and drivers, since the stream is adapted after the application and printer driver have generated the page description language. Thus, this type of adaptation has been deemed as an acceptable concept applied to page description language streams and headers which are potentially not compliant with various other print devices.

It will be apparent to one skilled in the art that this same concept of moving various page description language header elements into the page description language body may be applied to many other types of header element commands. The most commonly used settings found in print jobs that may be specified in page description language headers will be handled. Examples of such include, but are not limited to: simplex/duplex, media size, orientation, etc.

It is recognized that not all header elements can be handled in the page description language-specific language command syntax. However, many of the most common and important header elements used in a typical print job nevertheless can be expressed, either in the page description language-specific language, or as an expression of a more advanced finishing option which is not essential to successful printing. For cases where an advanced finishing option is requested, the system employing the automatic device-independent adaptation of page description language data streams methodology may notify the user if desired, as discussed above, and allow the user to make a determination of the desirability of this advanced finishing option when it is not available.

The automatic device-independent adaptation of page description language data streams methodology described above handles page description language compliance by adapting the page description language stream just before it goes to the device. Other approaches deal with page description language compliance at the source (where the page description language is generated) or at the destination (the devices) rather than in-stream on the server.

The above-described automatic device-independent adaptation of page description language data streams approach allows output management systems to more optimally direct a given job to the most appropriate print device thereby maximizing throughput. By modifying the page description language stream on-the-fly, the mapping of various sources to various destinations is enabled and thus does not force a sole source or small destination group of print devices.

The automatic device-independent adaptation of page description language data streams methodology described above also does not interfere with existing printing infrastructure, and the automatic device-independent adaptation of page description language data streams methodology described above does not need to be reinstalled when infrastructure changes do occur.

In summary, a method enables device independent adaptation of print jobs by receiving a print job having a print job header and page description language, parsing the received print job to delineate the print job header commands and the page description language commands for headers which contain custom operations instead of page description language standard operations. The print job header commands are transformed into suitable page description language commands and then redacted from the print job to leave as remaining the page description language. The transformed suitable page description language commands are imbedded into the remaining page description language data of the redacted print job to create a resultant page description language only print job. That resultant page description language only print job is sent job to a print system.

Moreover, a method enables device independent adaptation of print jobs by receiving a print job having a print job header and page description language, parsing the received print job to delineate the print job header elements and the page description language commands. Each print job header element is examined to determine its adaptability for transformation into page description language and those determined as adaptable are transformed into suitable page description language commands. The print job header elements determined as adaptable are redacted from the print job. The transformed suitable page description language commands are imbedded into the remaining page description language data of the redacted print job to create a resultant new page description language data which is directed to the selected alternate printer. In an another arrangement the resultant new page description language data is directed to the most suitable of one or more available print devices as based upon the relative success in transforming the print job header elements.

In addition, a system for device independent adaptation of print jobs in a page description language includes a print job server for an at least one network connected print device, which intercepts any print jobs directed at the at least one network connected print device. Located on the print job server is a print job header parsing application, which when a print job is intercepted will parse and remove the print job header from the page description language; transform print job header commands into page description language commands; imbed those page description language commands in the original page description language data; and there-from send on a resulting page description language stream.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method to enable device independent adaptation of print jobs comprising:
   receiving a print job having a device dependent print job header and page description language body image data;
   parsing the print job to delineate device dependent print job header and page description language body image data, the delineated device dependent print job header including print job header commands;
   determining if a print job header command, from the delineated device dependent print job header, can be realized in a page description language specific language;
   generating, when it is determined that the print job header command can be realized in a page description language specific language, a device independent page description language specific language commands corresponding to the print job header command;
   redacting the print job header command, when a corresponding device independent page description language specific language command has been generated, from the print job;
   embedding the device independent page description language specific language command into the page description language body image data of the redacted print job to create a device independent page description language only print job; and
   sending the device independent page description language only print job to a print system.

2. The method of claim 1 further comprising:
   generating a flag when a print job header command cannot be realized in a page description language specific language.

3. The method of claim 2 wherein the flag provides for notification to the user.

4. The method of claim 3 wherein the notification to the user allows for user selection of printing of the print job as best can do or the cancelation of the print job.

5. The method of claim 2 further comprising:
   determining to which print device of at least two selectable print devices to send the device independent page description language only print job.

6. The method of claim 5 wherein determining to which print device to send the print job is dependent upon a state of the generated flag.

7. The method of claim 6 wherein the print job is sent to a print device matching the print driver which generated the device dependent print job header commands, if a corresponding device independent page description language specific language command has not been generated.

8. The method of claim 6 further comprising:
   replicating the page description language body image data a number of times which satisfies a redacted print job header command for multiple copies.

9. The method of claim 8 wherein redaction and embedding obtains a copy count setting from a redacted print job header command for multiple copies, and for each page in the document, places that copy count setting on each individual page for the page description language body image data.

10. A system for device independent adaptation of print jobs in a page description language comprising:
    a print job server, operatively connected to a network connected print device, to intercept print jobs directed to the network connected print device;
    said print job server intercepting a print job having a device dependent print job header and page description language body image data;
    said print job server parsing the print job to delineate device dependent print job header and page description language body image data, the delineated device dependent print job header including print job header commands;
    said print job server determining if a print job header command, from the delineated device dependent print job header, can be realized in a page description language specific language;
    said print job server generating, when it is determined that the print job header command can be realized in a page description language specific language, a device independent page description language specific language command corresponding to the print job header command;
    said print job server redacting the print job header commands, when a corresponding device independent page description language specific language command has been generated, from the print job;
    said print job server embedding the device independent page description language specific language command into the page description language body image data of the redacted print job to create a device independent page description language only print job;
    said print job server sending the device independent page description language only print job to the network connected print device.

11. The system of claim 10, wherein said print job server generates a flag when a print job header command cannot be realized in a page description language specific language.

12. The system of claim 11, wherein the flag provides for notification to the user.

13. The system of claim 12, wherein the notification to the user allows for user selection of printing of the print job as best can do or the cancelation of the print job.

14. The system of claim 11, wherein said print job server sends the intercepted print job to a printing device matching the print driver which generated the device dependent print job header commands, if a corresponding device independent page description language specific language command has not been generated.

15. The system of claim 10, wherein said print job server replicating the page description language body image data a number of times which satisfies a redacted print job header command for multiple copies.

* * * * *